(12) United States Patent
Uenoyama et al.

(10) Patent No.: US 11,904,879 B2
(45) Date of Patent: Feb. 20, 2024

(54) INFORMATION PROCESSING APPARATUS, RECORDING MEDIUM, AND INFORMATION PROCESSING METHOD

(71) Applicant: TOYOTA JIDOSHA KABUSHIKI KAISHA, Toyota (JP)

(72) Inventors: Naoki Uenoyama, Nagoya (JP); Josuke Yamane, Nisshin (JP); Hikaru Gotoh, Nagoya (JP); Takumi Fukunaga, Nisshin (JP); Shin Sakurada, Toyota (JP); Soutaro Kaneko, Nagoya (JP); Rio Minagawa, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 235 days.

(21) Appl. No.: 17/148,723

(22) Filed: Jan. 14, 2021

(65) Prior Publication Data

US 2021/0221394 A1 Jul. 22, 2021

(30) Foreign Application Priority Data

Jan. 16, 2020 (JP) .................. 2020-005333

(51) Int. Cl.
 *B60W 50/12* (2012.01)
 *B60W 30/08* (2012.01)
 *B60W 40/09* (2012.01)
(52) U.S. Cl.
 CPC ............ *B60W 50/12* (2013.01); *B60W 30/08* (2013.01); *B60W 40/09* (2013.01); *B60W 2540/106* (2013.01)

(58) Field of Classification Search
 CPC ...... B60W 50/12; B60W 30/08; B60W 40/09; B60W 2540/106; B60W 2540/18; B60W 2540/30; B60W 2540/21; B60W 2050/143; B60W 2552/05; B60K 31/00; B60K 2031/0091
 See application file for complete search history.

(56) References Cited

U.S. PATENT DOCUMENTS

| | | | |
|---|---|---|---|
| 9,981,617 B1* | 5/2018 | MacDonald | F02D 41/3005 |
| 11,235,783 B2* | 2/2022 | Noda | G07C 5/00 |
| 2012/0166057 A1* | 6/2012 | Amato | B60K 31/0058 |
| | | | 701/96 |

(Continued)

FOREIGN PATENT DOCUMENTS

| | | |
|---|---|---|
| CN | 106965813 A | 7/2017 |
| JP | 2010-23769 A | 2/2010 |

(Continued)

*Primary Examiner* — Rachid Bendidi
*Assistant Examiner* — Dana F Artimez
(74) *Attorney, Agent, or Firm* — Oblon, McClelland, Maier & Neustadt, L.L.P.

(57) ABSTRACT

An information processing apparatus is mounted on a vehicle. The information processing apparatus includes a control unit that is configured to determine whether or not a driver of the vehicle is driving dangerously, and perform, when it is determined that the driver of the vehicle is driving dangerously, a first control process of determining output of a machine mounted on the vehicle to be performed at a second value that is smaller than a first value in a normal state, the first value determined according to first information based on a stroke amount of an accelerator pedal.

17 Claims, 5 Drawing Sheets

(56) References Cited

U.S. PATENT DOCUMENTS

| | | | |
|---|---|---|---|
| 2015/0199955 A1* | 7/2015 | Draganic | G08B 6/00 |
| | | | 381/86 |
| 2017/0203688 A1* | 7/2017 | Kuwahara | B60Q 9/00 |
| 2017/0203689 A1 | 7/2017 | Kuwahara et al. | |
| 2018/0236896 A1* | 8/2018 | Bessho | B60R 21/02 |
| 2019/0016316 A1* | 1/2019 | Sung | B60T 7/22 |
| 2019/0367029 A1* | 12/2019 | Martinez Ruvalcaba | |
| | | | B60W 50/087 |
| 2021/0339770 A1* | 11/2021 | Tamori | B60W 60/0015 |

FOREIGN PATENT DOCUMENTS

| | | | |
|---|---|---|---|
| JP | 2019-121243 A | | 7/2019 |
| JP | 2019-220037 A | | 12/2019 |
| JP | 2022031987 A | * | 2/2022 |

* cited by examiner

*FIG. 4*

INFORMATION PROCESSING APPARATUS, RECORDING MEDIUM, AND INFORMATION PROCESSING METHOD

CROSS REFERENCE TO RELATED APPLICATION

This application claims the benefit of Japanese Patent Application No. 2020-005333, filed on Jan. 16, 2020, which is hereby incorporated by reference herein in its entirety.

BACKGROUND

Technical Field

The present disclosure relates to an information processing apparatus, a recording medium, and an information processing method.

Description of the Related Art

There is disclosed a technique of suppressing dangerous driving by limiting a permitted pedaling range of an accelerator pedal when a driver of a vehicle is detected to be driving dangerously (for example, Patent document 1).

CITATION LIST

Patent Document

[Patent document 1] Japanese Patent Laid-Open No. 2019-121243

However, in the case of suppressing dangerous driving by hardware, the configuration of the hardware can be complicated.

An object of an aspect of the disclosure is to provide an apparatus that is capable of suppressing dangerous driving.

SUMMARY

An aspect of the present disclosure is an information processing apparatus to be mounted on a vehicle, the information processing apparatus comprising a controller configured to:
  determine whether or not a driver of the vehicle is driving dangerously, and
  perform, when it is determined that the driver of the vehicle is driving dangerously, a first control process of determining output of a machine mounted on the vehicle to be performed at a second value that is smaller than a first value in a normal state, the first value determined according to first information based on a stroke amount of an accelerator pedal.

Another aspect of the present disclosure is a non-transitory computer-readable recording medium recorded with a program for causing a computer that is mounted on a vehicle to:
  determine whether or not a driver of the vehicle is driving dangerously, and
  perform, when it is determined that the driver of the vehicle is driving dangerously, a first control process of determining output of a machine mounted on the vehicle to be performed at a second value that is smaller than a first value in a normal state, the first value determined according to first information based on a stroke amount of an accelerator pedal.

Another aspect of the disclosure is an information processing method to be performed by an information processing apparatus that is mounted on a vehicle, the information processing method comprising:
  determining whether or not a driver of the vehicle is driving dangerously, and
  performing, when it is determined that the driver of the vehicle is driving dangerously, a first control process of determining output of a machine mounted on the vehicle to be performed at a second value that is smaller than a first value in a normal state, the first value determined according to first information based on a stroke amount of an accelerator pedal.

According to the present disclosure, dangerous driving of a vehicle may be suppressed.

DESCRIPTION OF THE EMBODIMENTS

An aspect of the present disclosure is an information processing apparatus that is mounted on a vehicle. The information processing apparatus includes a controller that is configured to determine whether or not a driver of the vehicle is driving dangerously, and perform, when it is determined that the driver of the vehicle is driving dangerously, a first control process of determining output of a machine mounted on the vehicle to be performed at a second value that is smaller than a first value in a normal state, the first value determined according to first information based on a stroke amount of an accelerator pedal.

The information processing apparatus is an electronic control unit (ECU), for example. The machine that is mounted on the vehicle is an internal combustion engine such as an engine, or an electric motor, for example. The output of the machine is determined based on the number of revolutions and torque, for example. The first information based on the stroke amount of the accelerator pedal is the stroke amount itself of the accelerator pedal, an amount of change in the stroke amount of the accelerator pedal, or a speed at which the accelerator pedal is stepped on, for example.

According to the aspect of the present disclosure, in the case where the driver is driving dangerously, even if the accelerator pedal is stepped on, acceleration is made harder than in a normal state because the output of the machine is limited and made smaller than in a normal state. Therefore, dangerous driving such as tailgating of repeatedly approaching a vehicle in front at a fast speed may be suppressed, for example. Furthermore, the aspect of the present disclosure may be implemented simply by changing the process by the controller of the information processing apparatus, and the hardware configuration does not have to be changed. Therefore, additional changes may be easily made.

According to the aspect of the present disclosure, in the first control process, the controller may acquire position information on the vehicle, and determine the second value of the output of the machine for when dangerous driving is determined, based on information about a road where the vehicle is traveling. Even in a case where it is determined that the driver is driving dangerously and acceleration is made harder than in a normal state even with the accelerator pedal stepped on, if traveling is not performed at a speed according to a surrounding environment, the vehicle will be exposed to danger. The output of the machine in case of determination of dangerous driving is determined based on the information about a road where the vehicle is traveling. According to this, traveling may be performed at a speed according to the surrounding environment even in a state where the output of the machine for when dangerous driving is determined is limited.

For example, the controller may determine the second value of the output of the machine for when dangerous driving is determined, in such a way that the second value is smaller in a case where a width of the road where the vehicle is traveling is smaller than a predetermined value than in a case where the width of the road where the vehicle is traveling is equal to or greater than the predetermined value. On a road with a small width, a speed limit tends to be lower and a traveling speed of a peripheral vehicle traveling on the road tends to be lower than on a road with a great width. Accordingly, for example, if tailgating or the like is performed on a road with a small width, risk of accidents and the like is increased for the vehicle in front, which is being tailgated, and also for the vehicle that is tailgating. Accordingly, the output of the machine for when dangerous driving is determined may be made even smaller when traveling is performed on a road with a small width to thereby make tailgating or the like difficult and avoid danger.

For example, the controller may determine the second value in such a way that the second value is greater in a case where the road where the vehicle is traveling is an expressway than in a case where the road where the vehicle is traveling is a local road. For example, on an expressway, the speed limit is higher than on a local road, and speeds of vehicles traveling in the surroundings are higher than on a local road. If, in such a surrounding environment, the speed of a vehicle is made significantly lower than those of vehicles in the surroundings due to determination of dangerous driving, the vehicle will be exposed to danger. In the case where the road where a vehicle is traveling is an expressway, a situation where the speed is made significantly lower than those of vehicles in the surroundings may be avoided even when dangerous driving is determined, by making the second value of the output of the machine greater than on a local road.

Furthermore, according to the aspect of the present disclosure, in the first control process, the controller may cause audio data of sound that is generated by the output of the machine to be output from a speaker provided in the vehicle at a volume at which the driver hears the output of the machine as if the output is being performed at the first value. In the first control process, the output of the machine is limited, and acceleration is not normally performed even when the driver steps on the accelerator pedal, and thus, the driver tends to further step on the accelerator pedal. Accordingly, in the first control process, when the accelerator pedal is stepped on, the audio data is output from the speaker in such a way that the sound that is generated by the output of the machine is at the same volume as in a normal state. The driver may thereby feel that acceleration is being performed as in a normal state, and it may be suppressed that the driver further steps on the accelerator pedal to accelerate.

In the following, an embodiment of the present disclosure will be described with reference to the drawings. The configuration of the embodiment described below is an example, and the present disclosure is not limited to the configuration of the embodiment.

First Embodiment

Figure 1:
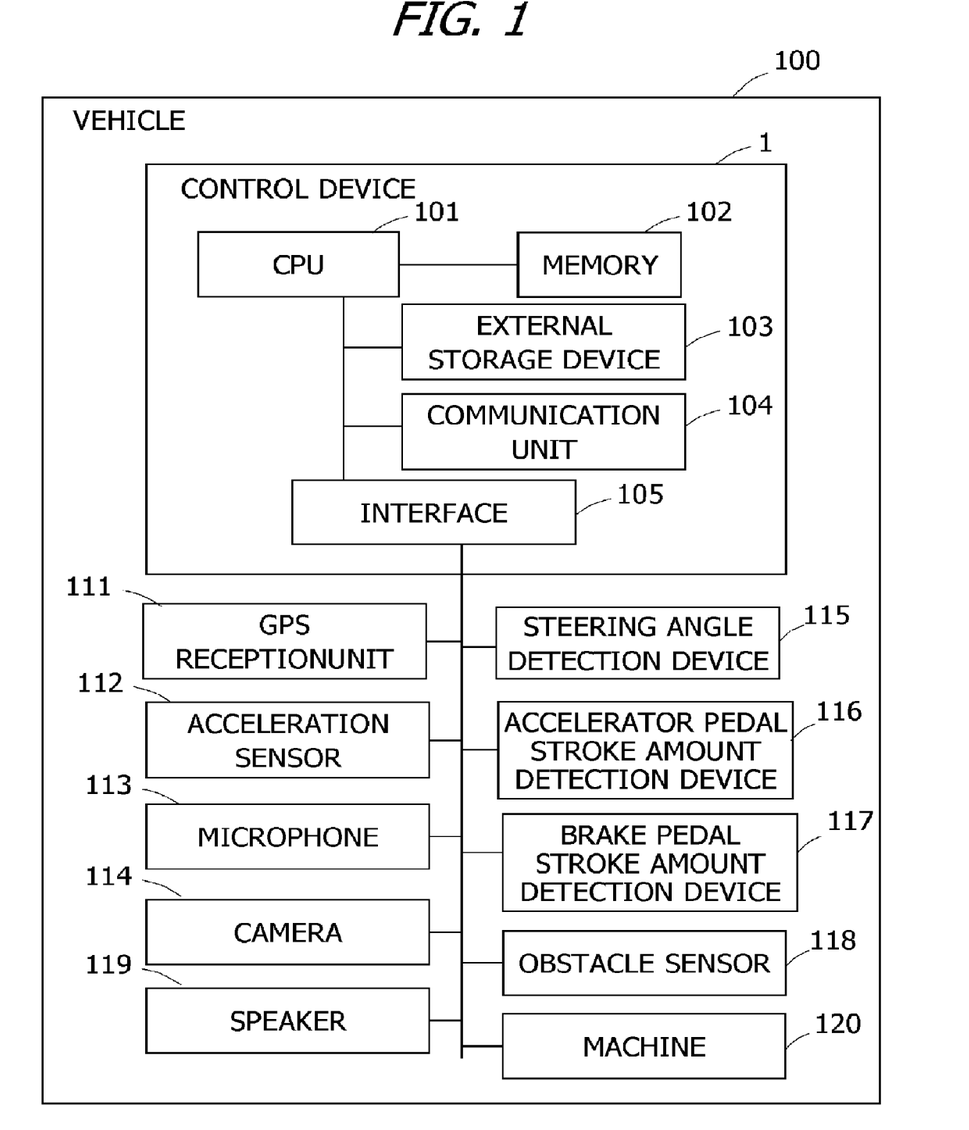
FIG. 1 is a diagram illustrating an example of a hardware configuration of a vehicle according to a first embodiment.

FIG. 1 is a diagram illustrating an example of a hardware configuration of a vehicle 100 according to a first embodiment. The vehicle 100 is a vehicle that suppresses dangerous driving in a case where a driver is detected to be driving dangerously, by reducing output of a machine that is determined according to a stroke amount of an accelerator pedal than in a normal state and limiting acceleration. In the following, a control process related to output of the machine will be referred to as a machine output control process. Additionally, FIG. 1 extracts and illustrates the hardware configuration related to the machine output control process, among the hardware configuration of the vehicle 100. As the hardware configuration related to the machine output control process, the vehicle 100 includes a control device 1, a GPS reception unit 111, an acceleration sensor 112, a microphone 113, a camera 114, a steering angle detection device 115, an accelerator pedal stroke amount detection device 116, a brake pedal stroke amount detection device 117, an obstacle sensor 118, a speaker 119, and a machine 120.

The GPS reception unit 111 receives radio waves carrying time signals from a plurality of global positioning satellites orbiting the Earth, and stores the time signals in a register of the control device 1, for example. The acceleration sensor 112 measures acceleration applied to the vehicle 100. A detection value of the acceleration sensor 112 may be used to detect sudden braking or sudden starting, for example. The microphone 113 is installed facing the inside of the vehicle 100, and collects sound inside the vehicle 100. The sound collected by the microphone 113 may be used to detect an angry voice or the like of a driver. For example, the camera 114 is installed at a front part of the vehicle 100 in a manner facing outward, and captures a front side of the vehicle 100. An image captured by the camera 114 may be used to acquire information about a road being traveled, for example.

The steering angle detection device 115 detects a steering angle that is the angle of a steering wheel that is turned by the driver. For example, the steering angle may be used to detect sudden steering. The accelerator pedal stroke amount detection device 116 detects a stepping amount (stroke amount) of the accelerator pedal by the driver. For example, the stroke amount of the accelerator pedal may be used to determine output of the machine 120, and to detect sudden starting. The brake pedal stroke amount detection device 117 detects a stepping amount of a brake pedal by the driver. For example, the stroke amount of the brake pedal may be used to detect sudden braking.

The obstacle sensor 118 is a millimeter-wave radar or light detection and ranging (LIDAR), for example. The obstacle sensor 118 is provided at a front part of the vehicle 100, and acquires a distance to an obstacle in the front, for example. An obstacle may be another vehicle, a building, a pedestrian or the like, for example. The speaker 119 is installed facing the inside of the vehicle 100, and outputs sound that is amplified to a specified volume. The machine 120 is a power source of the vehicle 100. The machine 120 is an internal combustion engine such as an engine, or an electric motor, for example.

The control device 1 is, but not limited to, an ECU, for example. As hardware configuration, the control device 1 includes a central processing unit (CPU) 101, a memory 102, an external storage device 103, a communication unit 104, and an interface 105. The memory 102 and the external storage device 103 are each a computer-readable recording medium. The control device 1 is an example of "information processing apparatus".

The external storage device 103 stores various programs, and data that is used by the CPU 101 at the time of execution of each program. For example, the external storage device 103 is an erasable programmable ROM (EPROM) or a hard disk drive. Programs held in the external storage device 103 include the operating system (OS), a machine output control program, and various other application programs, for example. The machine output control program is a program for controlling output of the machine 120.

The memory 102 is a main memory that provides, to the CPU 101, a storage area and a work area for loading programs stored in the external storage device 103, and that is used as a buffer. The memory 102 includes semiconductor memories such as a read only memory (ROM) and a random access memory (RAM), for example.

The CPU 101 performs various processes by loading the OS and various application programs held in the external storage device 103 into the memory 102 and executing the same. The number of CPUs 101 is not limited to one, and a plurality of CPUs may be provided. The CPU 101 is an example of "controller" of "information processing apparatus".

The communication unit 104 is an interface through which information is input/output to and from a network. The communication unit 104 may be an interface that connects to a cable network, or may be an interface that connects to a wireless network. For example, the communication unit 104 is a network interface card (NIC) or a wireless circuit. For example, the communication unit 104 may perform communication according to a near field wireless communication standard such as Bluetooth (registered trademark) or WiFi-Direct.

The interface 105 connects hardware structural elements of the vehicle 100 other than the control device 1 to the control device 1. The GPS reception unit 111, the acceleration sensor 112, the camera 114, the steering angle detection device 115, the accelerator pedal stroke amount detection device 116, the brake pedal stroke amount detection device 117, the obstacle sensor 118, the speaker 119, the machine 120 and the like are connected to the interface 105. Additionally, the hardware configuration of the vehicle 100 illustrated in FIG. 1 is merely an example and is not restrictive.

Figure 2:
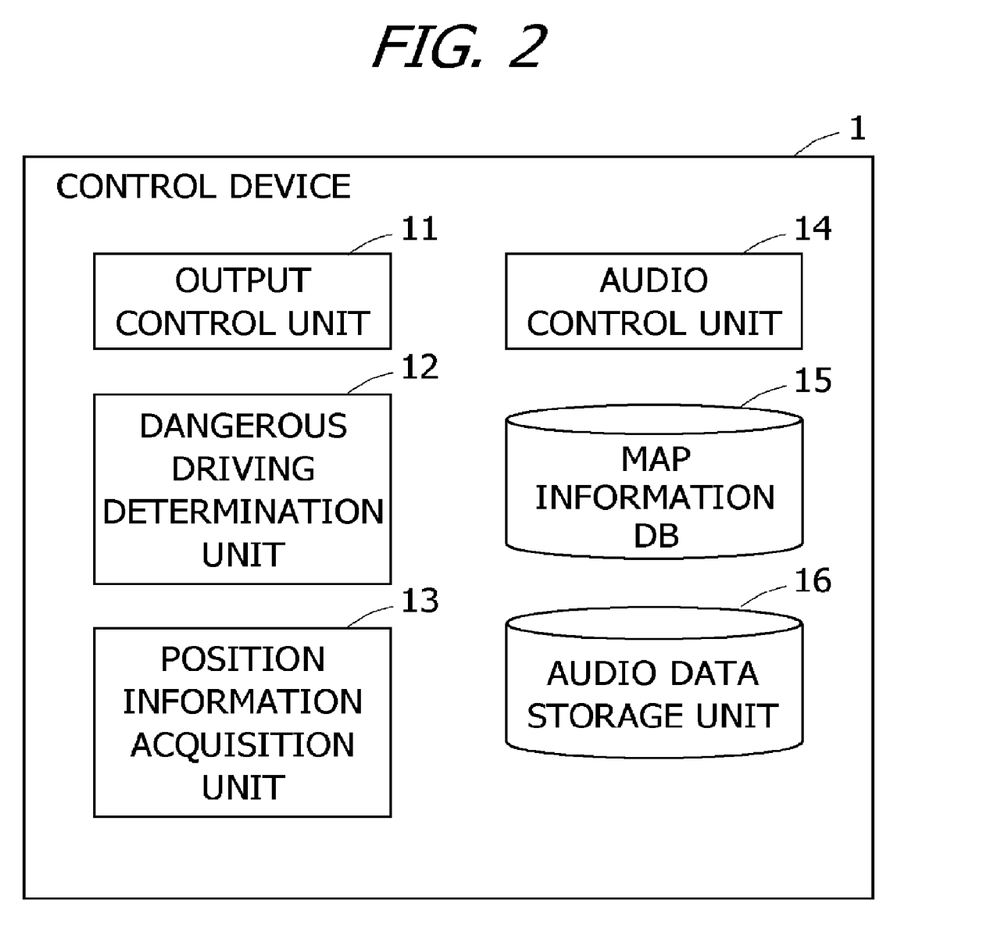
FIG. 2 is a diagram illustrating an example of a functional configuration of the control device.

FIG. 2 is a diagram illustrating an example of a functional configuration of the control device 1. As functional structural elements, the control device 1 includes an output control unit 11, a dangerous driving determination unit 12, a position information acquisition unit 13, an audio control unit 14, a map information database (DB) 15, and an audio data storage unit 16. These functional structural elements are implemented by the CPU 101 executing predetermined programs.

The output control unit 11 controls output of the machine 120. In the first embodiment, output control for the machine 120 includes a normal mode and a limited output mode. In the limited output mode, output of the machine 120 is limited. When it is determined that by the dangerous driving determination unit 12 that a driver is driving dangerously, the normal mode is switched to the limited output mode.

Furthermore, when a predetermined period of time passes with the driver not driving dangerously, the output control unit 11 switches the limited output mode to the normal mode.

In either mode, the output of the machine 120 is determined by the output control unit 11 based on information about the stroke amount of the accelerator pedal. For example, information about the stroke amount of the accelerator pedal may be information that is acquired from the stroke amount of the accelerator pedal, such as the stroke amount itself of the accelerator pedal, an amount of change in the stroke amount of the accelerator pedal or a stroke speed of the accelerator pedal, and any of the above may be used. Information about the stroke amount of the accelerator pedal is an example of "first information".

In the case where the stroke amount of the accelerator pedal is the same, the output of the machine 120 in the limited output mode is determined to take a value that is smaller than in the normal mode. For example, in the case where the output of the machine 120 is acquired by predetermined functions in the normal mode and the limited output mode, the function that is used in the limited output mode may be a function with which the amount of increase in the output of the machine 120 relative to an increase in the stroke amount is smaller than with the function used in the normal mode. Alternatively, the output of the machine 120 may be determined by a predetermined function in the normal mode, and, in the limited output mode, a value that is obtained by multiplying the value of the output of the machine 120 in the normal mode by a coefficient of one or less may be given as the value of the output of the machine 120.

Figure 3:
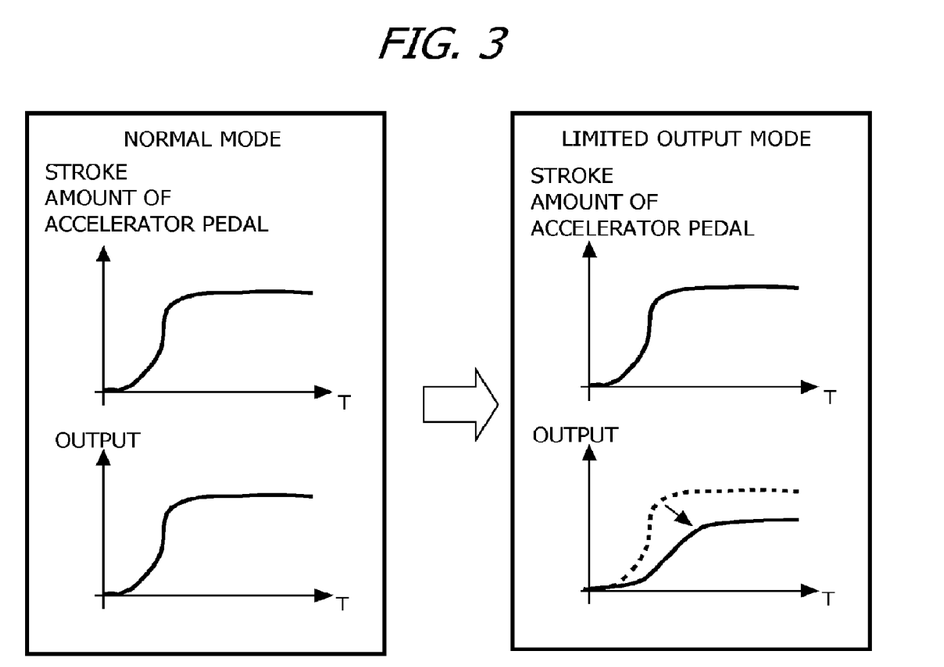
FIG. 3 illustrates an example of the output of the machine in each of the normal mode and the limited output mode.

FIG. 3 illustrates an example of the output of the machine 120 in each of the normal mode and the limited output mode. In FIG. 3, the machine 120 is assumed to be an engine. FIG. 3 illustrates, for both the normal mode and the limited output mode, a graph indicating a relationship between time and the stroke amount of the accelerator pedal, and a graph indicating a relationship between time and the output of the machine 120, and the graphs are synchronized in terms of time. Furthermore, conditions for the graph indicating the relationship between time and the stroke amount of the accelerator pedal are the same for the normal mode and the limited output mode. In the graph of the limited output mode indicating the relationship between time and the output of the machine 120, the output of the machine 120 in the normal mode is also indicated by a dotted line.

In the graph of the limited output mode indicating the relationship between time and the output of the machine 120, the output of the machine 120 takes a smaller value than that of the output of the machine 120 in the normal mode for the same stroke amount of the accelerator pedal. Furthermore, an amount of change in the output of the machine 120 in relation to the stroke amount of the accelerator pedal per unit time is also smaller in the limited output mode than in the normal mode.

Additionally, also in the case where the machine 120 is not an engine but an electric motor, and in the case where the output of the machine 120 is determined based not on the stroke amount of the accelerator pedal but on a stepping speed of the accelerator pedal, the output of the machine 120 in the normal mode and in the limited output mode is approximately the same.

Referring back to FIG. 2, in the case of determining the output of the machine 120 in the limited output mode, the output control unit 11 also takes a traveling location of the vehicle 100 into account. For example, in the limited output mode, the output control unit 11 determines, as the output of the machine 120, a value that is smaller in a case where the vehicle 100 is traveling on a road with a width smaller than a threshold than in a case where the vehicle 100 is traveling on a road with a width equal to or greater than the threshold. For example, in the limited output mode, the output control unit 11 determines, as the output of the machine 120, a value that is greater in a case where the vehicle 100 is traveling on an expressway than in a case where the vehicle 100 is traveling on a local road. The output control unit 11 identifies the traveling location of the vehicle 100 based on position information acquired by the position information acquisition unit 13, described later, and the map information DB 15, for example. Furthermore, the width of a traveling road may be acquired by estimation based on a captured image of the camera 114 or from the map information DB 15, for example. The output control unit 11 outputs the determined output value to the machine 120, and the machine 120 then operates to achieve the output value determined by the output control unit 11. The vehicle 100 accelerates according to operation of the machine 120.

Furthermore, the output of the machine 120 in the limited output mode may be determined using a function that is selected according to the traveling location of the vehicle 100 from a plurality of functions each according to a road width, the type of a road or the like, for example. Alternatively, the output of the machine 120 in the limited output mode may be determined by multiplying the output of the machine 120 in the normal mode by a coefficient that is selected according to the traveling location of the vehicle 100 from a plurality of coefficients each according to a road width, the type of a road or the like, for example.

Furthermore, in the limited output mode, the output control unit 11 causes sound that is generated by the output of the machine 120 to be output from the speaker, through the audio control unit 14 described later, in such a manner that the driver hears the sound as if it is the sound that is generated by the output of the machine 120 in the normal mode.

For example, in the case where the machine 120 is an engine, when the driver steps on the accelerator pedal in the limited output mode, an engine sound is output from the speaker 119. The engine sound tends to be greater, the greater the output of the engine. Accordingly, the engine sound that is output from the speaker 119 in the limited output mode is an engine sound with a volume that supplements the engine sound that is actually generated in the limited output mode such that the engine sound is heard as if the engine sound is generated at the same stroke amount of the accelerator pedal as in the normal mode. For example, the engine sound that is output from the speaker 119 in the limited output mode may have the same volume as the engine sound that is generated in the normal mode at the same stroke amount of the accelerator pedal.

Furthermore, the output control unit 11 controls the volume of the sound that is generated by the output of the machine 120 and that is output from the speaker 119, in synchronization with stepping of the accelerator pedal by the driver. For example, the volume of the sound that is generated by the output of the machine 120 and that is output from the speaker 119 may be determined using a function that is defined in advance according to the value of output of the machine 120. Additionally, the method of controlling the volume of the sound that is generated by the output of the machine 120 is not limited to a specific method, and any method may be adopted. The process by the output control unit 11 in the limited output mode is an example of "first control process".

The dangerous driving determination unit 12 acquires, every predetermined period of time and through the interface 105, a detection value that is detected by each of the acceleration sensor 112, the microphone 113, the steering angle detection device 115, the accelerator pedal stroke amount detection device 116, and the brake pedal stroke amount detection device 117. The dangerous driving determination unit 12 determines whether or not the driver is driving dangerously, based on these detection values.

In the method of determining dangerous driving of the driver, the dangerous driving determination unit 12 may use the degree of danger, for example. The degree of danger is determined based on one or a plurality of the number of times of sudden braking, the number of times of sudden steering, the number of times of sudden starting, an inter-vehicular distance, a relative speed and the like in a predetermined period of time. For example, points are set for each of sudden braking, sudden steering, sudden starting, the inter-vehicular distance, the relative speed and the like, and the degree of danger may be determined as a total of points of detected items among those mentioned above. For example, points are set for each time of detection of each of sudden braking, sudden steering and sudden starting. For example, points are set for when the inter-vehicular distance is detected to be smaller than a predetermined value. For example, points are set for when the speed of a subject vehicle is detected to be faster than that of a vehicle in front. Additionally, definitions of the degree of danger are not limited to those described above, and any known definition may be used.

Sudden braking may be detected when an amount of change in the stroke amount of the brake pedal is equal to or greater than a predetermined threshold and/or when a value of the acceleration sensor 112 in an opposite direction from a traveling direction of the vehicle 100 is equal to or greater than a threshold, for example. Sudden steering may be detected when an amount of change in the steering angle is equal to or greater than a predetermined threshold and/or when a value of the acceleration sensor 112 in a predetermined direction is equal to or greater than a threshold, for example. Sudden starting may be detected when an amount of change in the stroke amount of the accelerator pedal is equal to or greater than a predetermined threshold and/or when a value of the acceleration sensor 112 in the traveling direction of the vehicle 100 is equal to or greater than a threshold, for example.

Additionally, elements used for calculating the degree of danger may be detection of a word corresponding to a curse from an analysis result of sound inside the vehicle 100, detection of an angry expression of the driver from an analysis result of a captured image of a camera that is installed facing the inside of the vehicle, and the number of times a horn is beeped, for example.

When the degree of danger is acquired, the dangerous driving determination unit 12 may compare the degree of danger with a threshold, and may determine that the driver is driving dangerously, in a case where the degree of danger is greater than the threshold. The dangerous driving determination unit 12 outputs, to the output control unit 11, a determination result of whether or not the driver is driving dangerously. Additionally, the method of determining whether or not the driver is driving dangerously is not limited to the method of using the degree of danger. For example, a definition of dangerous driving may be provided, and dangerous driving of the driver may be determined when dangerous driving is detected a predetermined number of times or more in a predetermined period of time. Dangerous driving in this case may be defined as a change in the steering angle, a pedaling amount of the accelerator pedal, a pedaling amount of the brake or the like being equal to or greater than a threshold, for example. Furthermore, definitions of dangerous driving may include detection of words assumed to be curses from sound inside the vehicle 100, detection of an angry expression of the driver from an image of a camera that is installed facing the inside of the vehicle, and the like.

The position information acquisition unit 13 reads out the position information on the vehicle 100 that is written in the register of the control device 1 by the GPS reception unit 111. For example, the position information acquisition unit 13 may read out the position information according to an instruction from the output control unit 11, or may read out the position information every predetermined period of time, and output the position information that is read out, in response to a request from the output control unit 11.

The audio control unit 14 reads out from the audio data storage unit 16, according to an instruction from the output control unit 11, data of sound that is generated by the output of the machine 120, and outputs the audio data that is read out, from the speaker 119, at a volume that is specified by the output control unit 11. For example, audio data of the sound that is generated by the output of the machine 120 is output from the speaker 119 according to stepping of the accelerator pedal, for example.

The map information DB 15 and the audio data storage unit 16 are created in a storage area of the external storage device 103 of the control device 1. The map information DB 15 stores map data. The audio data storage unit 16 stores audio data of sound that is generated by the output of the machine 120.

Additionally, in the limited output mode, the sound that is generated by the output of the machine 120 and that is output from the speaker 119 may be sound that is obtained in real time by collecting, by the microphone 113 or the like, and amplifying the sound that is generated by the output of the machine 120.

Flow of Processes

Figure 4:
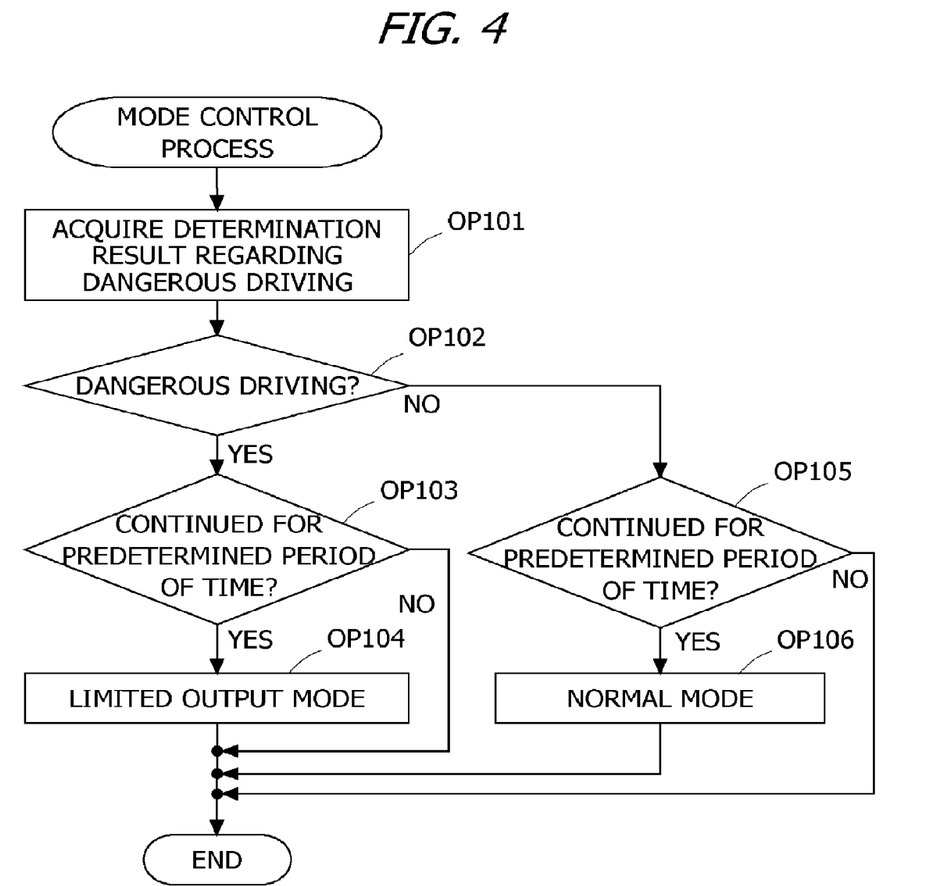
FIG. 4 is an example of a flowchart of a mode control process by the control device.

FIG. 4 is an example of a flowchart of a mode control process by the control device 1. The mode control process is a process for controlling switching between the normal mode and the limited output mode. An initial value of the mode is the normal mode. The process illustrated in FIG. 4 is repeatedly performed during operation of the control device 1 or during traveling of the vehicle 100. The performer of the process illustrated in FIG. 4 is the CPU 101 of the control device 1, but a description will be given taking a functional structural element as the performer for the sake of convenience. The same applies to the flowchart illustrated in FIG. 5 described later.

In OP101, the output control unit 11 acquires, from the dangerous driving determination unit 12, a determination result indicating whether or not the driver is driving dangerously. In OP102, the output control unit 11 performs determination of the acquired determination result. In the case where the determination result indicates that the driver is driving dangerously (OP102: YES), the process proceeds to OP103. In the case where the determination result does not indicate that the driver is driving dangerously (OP102: NO), the process proceeds to OP105.

In OP103, the output control unit 11 determines whether or not the determination result indicating that the driver is driving dangerously is being output continuously for a predetermined period of time. In the case where the determination result indicating the driver is driving dangerously is being output continuously for a predetermined period of time (OP103: YES), the process proceeds to OP104. In the case where the determination result indicating that the driver is driving dangerously is not being output continuously for a predetermined period of time (OP103: NO), the process illustrated in FIG. 4 is ended. In OP104, the output control unit 11 switches the mode to the limited output mode. Then, the process illustrated in FIG. 4 is ended. Thereafter, the output control unit 11 performs processing in the limited output mode.

In OP105, the output control unit 11 determines whether or not the determination result indicating that the driver is not driving dangerously is output continuously for a predetermined period of time. A threshold regarding a duration of the determination result, in OP105, indicating that the driver is not driving dangerously may be greater than or the same as a threshold regarding a duration of the determination result, in OP103, indicating that the driver is driving dangerously. In the case where the determination result indicating that the driver is not driving dangerously is output continuously for a predetermined period of time (OP105: YES), the process proceeds to OP106. In the case where the determination result that the driver is not driving dangerously is not output continuously for a predetermined period of time (OP105: NO), the process illustrated in FIG. 4 is ended. In OP106, the output control unit 11 switches the mode to the normal mode. Thereafter, the output control unit 11 performs processing in the normal mode. Processing in the normal mode refers to determination of an output value of the machine 120 according to the stroke amount of the accelerator pedal, for example. The process illustrated in FIG. 4 is then ended.

For example, in the case where, in the normal mode, the determination result indicating that the driver is driving dangerously is output continuously for a predetermined period of time (OP103: YES), processing by the output control unit 11 is switched to that in the limited output mode (OP104). Thereafter, the limited output mode is continued in a case where the determination result indicating that the driver is driving dangerously is output or the determination result indicating that the driver is not driving dangerously is output but not continuously for a predetermined period of time. Thereafter, the mode is switched from the limited output mode to the normal mode in a case where the determination result indicating that the driver is not driving dangerously continues for a predetermined period of time (OP105: YES).

Figure 5:
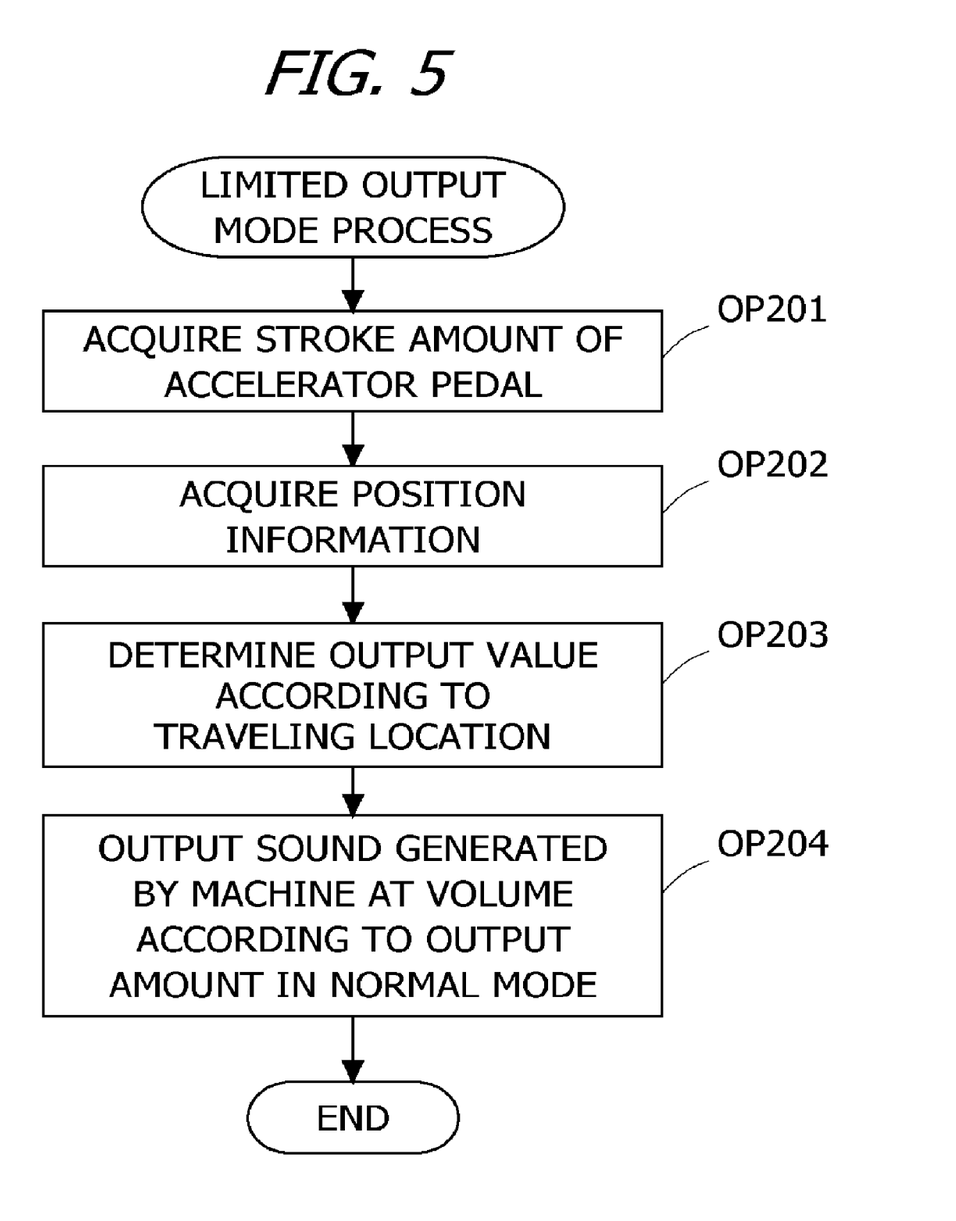
FIG. 5 is an example of a flowchart of a process by the control device in the limited output mode.

FIG. 5 is an example of a flowchart of a process by the control device 1 in the limited output mode. The process illustrated in FIG. 5 is started when switching to the limited output mode is performed in the process illustrated in FIG. 4, and is repeated until switching to the normal mode is performed, for example.

In OP201, the output control unit 11 acquires the stroke amount of the accelerator pedal from the accelerator pedal stroke amount detection device 116. In OP202, the output control unit 11 acquires the position information on the vehicle 100 from the position information acquisition unit 13.

In OP203, the output control unit 11 determines an output value of the machine 120. The output value of the machine 120 is determined based on the stroke amount of the accelerator pedal, the width of the traveling road, the type of the traveling road or the like. Additionally, in the limited output mode, the output value of the machine 120 is determined to be smaller than the output value of the machine 120 in the normal mode for the same stroke amount of the accelerator pedal. Furthermore, in the limited output mode, the output value of the machine 120 is determined to be smaller in a case where the width of the traveling road is smaller than a threshold than in a case where the width of the road is equal to or greater than the threshold. Moreover, in the limited output mode, the output value of the machine 120 is determined to be greater in a case where an expressway is being used than in a case where a local road is being used. The output control unit 11 instructs the machine 120 to perform output at the determined output value.

In OP204, the output control unit 11 instructs the audio control unit 14 to output audio data of the sound that is generated by the output of the machine 120, at a same volume as the sound that is generated by the output of the machine 120 in the normal mode for the same stroke amount of the accelerator pedal. Accordingly, the sound that is generated by the output of the machine 120 is output from the speaker 119 at the same volume as in a normal state. Then, the process illustrated in FIG. 5 is ended.

Effects of First Embodiment

In the first embodiment, when it is determined that the driver is driving dangerously, the output of the machine 120 is restricted in relation to the stroke amount of the accelerator pedal. For example, in the case where the driver is performing so-called tailgating, acceleration is not normally performed even when the accelerator pedal is stepped on, and catching up with the vehicle in front that is being tailgated becomes difficult, and tailgating may be suppressed as a result.

Furthermore, in the first embodiment, when it is determined that the driver is driving dangerously, audio data of the sound that is generated by the output of the machine 120 is output from the speaker 119 at a same volume as in a normal state, in addition to the output of the machine 120 being limited in relation to the stroke amount of the accelerator pedal. Accordingly, it is suppressed that the driver feels that the output of the machine 120 is limited in relation to the stroke amount of the accelerator pedal, and that the driver attempts to further accelerate by stepping on the accelerator pedal.

Furthermore, in the first embodiment, the output value of the machine 120 for when dangerous driving is determined is determined to be smaller in a case where the width of the traveling road is smaller than a threshold than in a case where the width is equal to or greater than the threshold. Moreover, the output value of the machine 120 for when dangerous driving is determined is determined to be greater in a case where the traveling road is an expressway than in a case where the traveling road is a local road. Because the output of the machine 120 is limited according to the road environment, it may be suppressed that the driver or a vehicle in the periphery is exposed to danger by limiting of the output of the machine 120.

Moreover, in the first embodiment, limiting of the output of the machine 120 is started when the driver is determined to be driving dangerously continuously for a predetermined period of time, and is released when the driver is determined not to be driving dangerously continuously for a predetermined period of time. Thereby it may be suppressed that the output of the machine 120 is limited frequently.

OTHER EMBODIMENTS

The embodiment described above is an example, and the present disclosure may be changed and carried out as appropriate without departing from the gist of the present disclosure.

In the first embodiment, when the output of the machine 120 is limited, the sound that is generated by the output of the machine 120 is output from the speaker 119 at the same volume as in a normal state. In addition, a method of generating vibration may be adopted, for example, to cause the driver to feel that the output of the machine 120 is the same as in a normal state. For example, in the case where the machine 120 is an engine, vibration caused by the output of the engine may be provided to the driver in the same manner as vibration caused by the output of the engine in a normal state such that the driver is less likely to notice that the output of the machine 120 is limited.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:
1. An information processing apparatus to be mounted on a vehicle, the information processing apparatus comprising:
  a controller configured to:
    determine whether or not a driver of the vehicle is driving dangerously, and
    perform, when it is determined that the driver of the vehicle is driving dangerously, a first control process of determining a second value of output of a machine mounted on the vehicle according to first information based on a first stroke amount of an accelerator pedal and outputting the second value to the machine to cause the machine to output at the second value, wherein
    the second value of the output of the machine is smaller than a first value of the output of the machine that is determined according to the first information based on the first stroke amount of the accelerator pedal when it is determined that the driver of the vehicle is not driving dangerously, the second value of the output of the machine and the first value of the output of the machine both correspond to the same first stroke amount, in the first control process, the controller acquires position information on the vehicle, determines a road where the vehicle is traveling is an expressway or a local road based on the position information, and determines the second value of the output of the machine in such a way that the second value of the output of the machine is greater in a case where the road where the vehicle is traveling is the expressway than in a case where the road where the vehicle is traveling is the local road, and in the first control process, when the driver treads the accelerator pedal by the first stroke amount and the output of the machine is the second value, the controller causes audio data of sound that is generated by the output of the machine at the second value to be output from a speaker provided in the vehicle at a volume that is the same as when the driver treads the accelerator pedal by the first stroke amount and the output of the machine is the first value.

2. The information processing apparatus according to claim 1, wherein the controller determines the second value of the output of the machine in such a way that the second value of the output of the machine is smaller in a case where a width of the road where the vehicle is traveling is smaller than a predetermined value than in a case where the width of the road where the vehicle is traveling is equal to or greater than the predetermined value.

3. The information processing apparatus according to claim 1, wherein the controller causes the first control process to stop, when it is determined that the driver of the vehicle is not driving dangerously continuously for a predetermined period of time.

4. The information processing apparatus according to claim 1, wherein the controller starts the first control process when it is determined that the driver of the vehicle is driving dangerously continuously for a predetermined period of time.

5. The information processing apparatus according to claim 1, wherein the controller is configured to determine the second value of the output of the machine by multiplying the first value of the output of the machine by a coefficient selected from a plurality of coefficients based upon the position information of the vehicle.

6. The information processing apparatus according to claim 1, wherein the controller is configured to, in the first control process, provide vibrations to the driver in the same manner as if the output is being performed at the first value.

7. A non-transitory computer-readable recording medium recorded with a program for causing a computer that is mounted on a vehicle to:

determine whether or not a driver of the vehicle is driving dangerously, and perform, when it is determined that the driver of the vehicle is driving dangerously, a first control process of determining a second value of output of a machine mounted on the vehicle according to first information based on a first stroke amount of an accelerator pedal and outputting the second value to the machine to cause the machine to output at the second value, wherein the second value of the output of the machine is smaller than a first value of the output of the machine that is determined according to the first information based on the first stroke amount of the accelerator pedal when it is determined that the driver of the vehicle is not driving dangerously, the second value of the output of the machine and the first value of the output of the machine both correspond to the same first stroke amount, in the first control process, the computer is caused to acquire position information on the vehicle, determine a road where the vehicle is traveling is an expressway or a local road based on the position information, and determine the second value of the output of the machine in such a way that the second value of the output of the machine is greater in a case where the road where the vehicle is traveling is the expressway than in a case where the road where the vehicle is traveling is the local road, and in the first control process, when the driver treads the accelerator pedal by the first stroke amount and the output of the machine is the second value, the computer is caused to output audio data of sound that is generated by the output of the machine at the second value from a speaker provided in the vehicle at a volume that is the same as when the driver treads the accelerator pedal by the first stroke amount and the output of the machine is the first value.

8. The non-transitory computer-readable recording medium recorded with the program according to claim 7, wherein the computer is caused to determine the second value of the output of the machine in such a way that the second value of the output of the machine is smaller in a case where a width of the road where the vehicle is traveling is smaller than a predetermined value than in a case where the width of the road where the vehicle is traveling is equal to or greater than the predetermined value.

9. The non-transitory computer-readable recording medium recorded with the program according to claim 7, wherein the computer is caused to stop the first control process when it is determined that the driver of the vehicle is not driving dangerously continuously for a predetermined period of time.

10. The non-transitory computer-readable recording medium recorded with the program according to claim 7, wherein the computer is caused to start the first control process when it is determined that the driver of the vehicle is driving dangerously continuously for a predetermined period of time.

11. The non-transitory computer-readable recording medium recorded with the program according to claim 7, wherein the computer is caused to determine the second value of the output of the machine by multiplying the first value of the output of the machine by a coefficient selected from a plurality of coefficients based upon the position information of the vehicle.

12. The non-transitory computer-readable recording medium recorded with the program according to claim 7, wherein the computer is caused to, in the first control process, provide vibrations to the driver in the same manner as if the output is being performed at the first value.

13. An information processing method to be performed by an information processing apparatus that is mounted on a vehicle, the information processing method comprising:

determining whether or not a driver of the vehicle is driving dangerously, and performing, when it is determined that the driver of the vehicle is driving dangerously, a first control process of determining a second value of output of a machine mounted on the vehicle according to first information based on a first stroke amount of an accelerator pedal and outputting the second value to the machine to cause the machine to output at the second value, wherein the second value of the output of the machine is smaller than a first value of the output of the machine that is determined according to the first information based on the first stroke amount of the accelerator pedal when it is determined that the driver of the vehicle is not driving dangerously, the second value of the output of the machine and the first value of the output of the machine both correspond to the same first stroke amount, in the first control process, the method includes acquiring position information on the vehicle, determining a road where the vehicle is traveling is an expressway or a local road based on the position information, and determining the second value of the output of the machine in such a way that the second value of the output of the machine is greater in a case where the road where the vehicle is traveling is the expressway than in a case where the road where the vehicle is traveling is the local road, and in the first control process, when the driver treads the accelerator pedal by the first stroke amount and the output of the machine is the second value, the method includes causing audio data of sound that is generated by the output of the machine at the second value to be output from a speaker provided in the vehicle at a volume that is the same as when the driver treads the accelerator pedal by the first stroke amount and the output of the machine is the first value.

14. The information processing method according to claim 13, wherein the second value of the output of the machine is determined in such a way that the second value of the output of the machine is smaller in a case where a width of the road where the vehicle is traveling is smaller than a predetermined value than in a case where the width of the road where the vehicle is traveling is equal to or greater than the predetermined value.

15. The information processing method according to claim 13, wherein the first control process is stopped when it is determined that the driver of the vehicle is not driving dangerously continuously for a predetermined period of time.

16. The information processing method according to claim 13, wherein the second value of the output of the machine is determined by multiplying the first value of the output of the machine by a coefficient selected from a plurality of coefficients based upon the position information of the vehicle.

17. The information processing method according to claim 13, further comprising, in the first control process, providing vibrations to the driver in the same manner as if the output is being performed at the first value.

* * * * *